STORAGE STABLE OLIGOURETHANES WHICH ARE SELF CROSS-LINKING AT ELEVATED TEMPERATURE OR CAN BE CROSS-LINKED WITH ORGANIC POLYISOCYANATES, A PROCESS FOR THEIR PREPARATION AND THEIR USE AS BINDERS OR BINDER COMPONENTS

BACKGROUND OF THE INVENTION

1. Field of the Invention

The present invention relates to new oligourethanes which are stable in storage at room temperature and self cross-linking at elevated temperatures or which can be cross-linked with organic polyisocyanates optionally having masked isocyanate groups, the oligourethanes having reversibly blocked amino groups attached through urethane groups. The present invention additionally relates to a process for the preparation of these oligourethanes by the reaction of organic polyisocyanates, in which some of the isocyanate groups are optionally masked, with monohydric or higher hydric alcohols containing reversibly blocked amino groups, and their use as binders or binder components.

2. Description of the Prior Art

Compounds containing reversibly blocked amino groups used as reactants for organic polyisocyanates containing optionally masked isocyanate groups are already known. Thus for example, DE-AS U.S. Pat. No.1,520,139 describes heat cross-linkable two-component systems which can be cured to form polyureas and in which one component contains free isocyanate groups while the other component contains reversibly blocked amino groups in the form of aldimine or ketimine groups. DE-AS U.S. Pat. No. 1,694,237 describes heat cross-linkable combinations of isocyanate prepolymers containing isocyanate groups masked with phenol groups, and aliphatic or aromatic compounds containing ketamine and/or enamine groups.

It is now surprisingly been found that certain tertiary amines which will be described below, obtained by the Michael additive of secondary amines to certain acrylic acid derivatives, also constitute masked secondary amines which may be mixed at room temperature with polyisocyanates containing masked and/or free isocyanate groups. The masked secondary amines react with these polyisocyanates at moderately elevated temperatures of about 90°–130° C. with urea formation and, as opposed to the prior processes, the presence of atmospheric moisture is not necessary. Furthermore, free and/or masked isocyanate groups can easily be built into these new, blocked secondary amines to form storage stable systems which can undergo self cross-linking when heated to moderately elevated temperatures of about 90°–130° C.

SUMMARY OF THE INVENTION

The present invention is directed to oligourethanes which are stable in storage at room temperature and either self cross-linking at elevated temperatures or capable of being cross-linked with organic polyisocyanates which may have at least partially masked isocyanate groups, containing (a) about 0.1 to 3% by weight of tertiary amine nitrogen atoms (atomic weight =14) in the form of structural units corresponding to the following formula attached through urethane groups either in end positions and/or within the molecule:

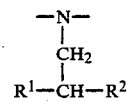

wherein
$R^1$ represents hydrogen or an alkyl group having 1 to 4 carbon atoms,
$R^2$ represents $-C\equiv N$, $-CO-NH_2$, $-CO-NHR^3$, $-CO-NR_2^3$ or $-COOR^3$ and
$R^3$ represents a monovalent hydrocarbon group optionally carrying inert substituents, (b) up to about 15% by weight of isocyanate groups (molecular weight =42) and (c) up to about 15% by weight of masked isocyanate groups (calculated as NCO, molecular weight =42).

The present invention also relates to a process for the preparation of these oligourethanes, characterized in that an organic polyisocyanate, optionally containing urethane groups and optionally having the isocyanate groups at least partly in a masked form, is reacted with compounds corresponding to the formula:

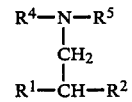

wherein
$R^1$ and $R^2$ have the meaning indicated above and
$R^4$ and $R^5$ may be identical or different and represent hydrocarbon groups having 1–20 carbon atoms or hydrocarbon groups with 2 to 20 carbon atoms carrying at least one alcoholic hydroxyl group as substituent, provided that at least one of the groups $R^4$ or $R^5$ has at least one alcoholic hydroxyl group, at an equivalent ratio of free isocyanate groups to hydroxyl groups within the range of about 0.7:1 to 2.5:1, the nature and quantitative proportions of the starting materials mentioned above being chosen so that the resulting oligourethanes contain (a) about 0.1 to 3% by weight of tertiary amine nitrogen atoms in the form of structural units corresponding to the above formula, (b) up to about 15% by weight of free isocyanate groups, and (c) up to about 15% by weight of masked isocyanate groups (calculated as NCO).

The invention also relates to the use of the oligourethanes, optionally in admixture with organic polyisocyanates which optionally have masked isocyanate groups, as binders for heat cross-linkable coating compounds.

DETAILED DESCRIPTION OF THE INVENTION

The compounds corresponding to the formula:

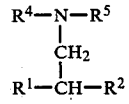

It is particularly preferred, however, to use organic polyisocyanates in the form of prepolymeric polyisocyanates such as may be obtained in known manner by the reaction of simple polyisocyanates with subequivalent quantities of compounds containing isocyanate reactive groups, preferably hydroxyl groups. These isocyanate prepolymers are preferably prepared from commercially readily available polyisocyanates, in particular diisocyanates. Examples of these include 2,4- and 2,6-tolylene diisocyanate and their commercial mixtures, diphenyl methane -2,4'- and -4,4'-diisocyanate and their commercial mixtures, isophorone diisocyanate and prehydro-4,4'-diphenyl methane diisocyanate.

When used for the preparation of the isocyanate prepolymers, these diisocyanates may be reacted with any organic compounds which contain at least two isocyanate-reactive hydrogen atoms, but are otherwise inert in the isocyanate addition reaction. It is preferred to use polyhydroxyl compounds, in particular those having 2-8, preferably 2 or 3 alcoholic hydroxyl groups. These compounds have a molecular weight of 62 to about 10,000, preferably from about 500 to 6,000.

The following are examples of suitable polyhydroxyl compounds:

(a) simple polyhydric alcohols within the molecular weight range of 62 to 399 optionally containing ether groups such as ethylene glycol, propylene glycol, 1,2- and 1,4-dihydroxy butane, 1,6-dihydroxy hexane, diethylene glycol, triethylene glycol, dipropylene glycol, tripropylene glycol, tetrapropylene glycol, trimethylol propane or glycerol;

(b) relatively high molecular weight polyester polyols within the molecular weight range of 400 to about 10,000, preferably about 500 to 6,000, based on the above mentioned, simply polyhydric alcohols and polybasic carboxylic acids or anhydrides of such acids such as adipic acid, phthalic acid, tetrahydrophthalic acid, hexahydrophthalic acid or the corresponding acid anhydrides:

(c) relatively high molecular weight polyether polyols in the molecular weight range of 400 to about 10,000, preferably about 500 to 6,000 such as the alkoxylation products of the simple polyhydric alcohols mentioned under a) or bisphenols such as bisphenol A. These polyols are prepared using ethylene oxide and/or propylene oxide as the alkoxylating agent and may be prepared from mixtures of various starting molecules.

The isocyanate prepolymers may, of course, be prepared from any mixtures of the compounds mentioned under (a) to (c) by way of example. In addition to these compounds mentioned as examples, the polythioethers, polyacetals, polycarbonates or polyester amides known from polyurethane chemistry may also be used for the preparation of the isocyanate prepolymers.

To prepare the isocyanate prepolymers, the starting materials mentioned above are generally reacted together at temperatures of about 20° to 150° C., preferably about 60° to 120° C., observing an equivalent ratio of isocyanate groups to isocyanate reactive groups of about 1.2:1 to 5:1, preferably about 1.5:1 to 3:1. From the given equivalent ratios of reactants, it is clear that the term "isocyanate prepolymers" used in the context of this invention also includes so called "semi-prepolymers," i.e. mixtures of true prepolymers with excess quantities of starting isocyanates.

The polyisocyanate component may be put into the process according to the invention either in its unmasked state or in a partially masked form. Suitable masking agents include lactams such as ε-caprolactam; oximes such as acetone oxime, methylethyl ketone oxime (butanone oxime) and cyclohexanone oxime; C—H—acidic compounds such as diethyl malonate, ethyl acetoacetate and acetyl acetone alcohols such as simple monohydric alcohols having 1 to 4 carbon atoms, 2-ethyl hexanol, ethylene glycol monoethyl ether and diethylene glycol monoethyl ether: phenols such as phenol, cresol and xylenol: and heterocyclic compounds such as triazoles, imidazolines, imidazoles and tetrahydropyrimidines. The masking agents described may be used singly or in the form of mixtures. ε-caprolactam, butanone oxime and diethyl malonate are preferred masking agents.

The polyisocyanate component used in the process according to the invention generally contains a total of free and masked isocyanate groups (calculated as NCO, molecular weight =42, based on the total weight of the polyisocyanate component including the masking agent) of about 1 to 25% by weight, preferably about 2 to 15% by weight, and has a free isocyanate group content, based on the total weight of polyisocyanates, including any masking agents present, of about 1 to 20% by weight, preferably about 1 to 12% by weight. The isocyanate functionality of the unmasked or partially masked polyisocyanates, i.e. the number of free isocyanate groups present on statistical average per molecule in the unmasked or partially masked polyisocyanate is generally about 0.3 to 3. When the tertiary amines used according to the invention have two or more hydroxyl groups, the isocyanate functionality is preferably less than two, for example about 0.5 to 1.8, in order to inhibit the formation of a high molecular weight polyurethane. When the preferred isocyanate prepolymers are used, the free isocyanate functionality may be adjusted both by the nature (functionality) of the starting polyisocyanates and polyhydroxyl compounds and by their quantitative proportions as well as by suitable choice of the quantity of masking agent. When partially masked polyisocyanates are used, they generally contain about from 0.2 to 3 masked isocyanate groups per free isocyanate group.

The masking reaction may be carried out in a known manner, either with or without solvents such as acetone, methylethyl ketone, ethylacetoacetate, butylacetate, toluene, xylene and/or aliphatic hydrocarbon solvents, at temperatures of up to about 150° C., preferably about 60°–120° C.

The process according to the invention, i.e. the reaction of the optionally partially masked polyisocyanates with the hydroxyl group-containing tertiary amines of the formula:

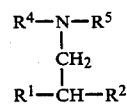

may be carried out solvent free or in the presence of suitable solvents, e.g. those of the type last mentioned by way of example, at about 20° to 120° C., preferably about 60° to 100° C., a prolonged heating above 90° C. is, however, to be avoided. The proportions of the reactants qenerally correspond to an NCOO M equivalent ratio of about 0.7:1 to 2.5:1, preferably about 0.9:1 to 1.5:1 and in particular about 1:1 to 1.2:1, based on the free isocyanate groups of the polyisocyanate components and the hydroxyl groups of the tertiary amines. An equivalent ratio below about 1:1 would generally only be employed when using the tertiary amines according to the invention which have at least two hydroxyl groups. An equivalent ratio above about 1.2:1 and in particular above about 1.5:1 would be suitable if it is required to obtain oligourethanes according to the invention which still contain free isocyanate groups.

According to a particular preferred embodiment of the process of the invention, the nature and quantitative proportions of the reactants are chosen so that the reaction products obtained have about 1 to 1.5, preferably about 1 to 1.2 free and masked isocyanate groups for each tertiary amino group present. Particularly valuable oligourethanes according to the invention are obtained when the nature and proportions of the reactants are chosen so that no free isocyanate groups are left in the oligourethanes and about 1 to 1.2 masked isocyanate groups are available for each tertiary amino nitrogen atom. Both the last mentioned, particularly preferred oligourethanes according to the invention and the above mentioned reaction products still containing free isocyanate groups (in addition to masked isocyanate groups) are polymer precursors which are stable in storage at room temperature and self cross-linking when subjected to heat.

According to a further but less preferred embodiment of the process according to the invention, polyisocyanates containing only free isocyanate groups are used and they are reacted with the hydroxyl groupcontaining tertiary amines at an NCO/OH equivalent ratio of about 1:1 to 1.2:1, preferably about 1:1 to 1.05:1. This procedure results in oligourethanes according to the invention in which the isocyanate group content is virtually zero (the slight isocyanate excess is usually eliminated by side reactions). The oligourethanes according to the invention obtained in this manner are, of course, not self cross-linking, but may be mixed with organic polyisocyanates, preferably with polyisocyanates having masked isocyanate groups, to form storage stable mixtures which are capable of being cross-linked at elevated temperatures.

According to a third, also less preferred embodiment of the preparation of the oligourethanes according to the invention, the optionally partially masked starting polyisocyanates are reacted with the hydroxyl group-containing tertiary amines at an equivalent ratio of free isocyanate groups to hydroxyl groups of about 1.1:1 to 5:1, preferably about 1.2:1 to 3:1, so that the oligourethanes obtained still have considerable quantities of free isocyanate groups and can be chain lengthened to relatively high molecular weight oligourethanes according to the invention by a reaction of the free isocyanate groups with chain lengthening agents. Suitable chain lengthening agents for this purpose include the simple polyhydric alcohols mentioned under (a) above or diamines within the molecular weight range of 60 to 400, such as ethylene diamine, hexamethylene diamine, isophorone diamine, 4,4'-diaminodicyclohexyl methane, 2,4- and/or 2,6-diamino toluene or 4,4'-diaminodiphenyl methane. Hydrazine and hydrazine derivatives, such as hydrazine hydrate, oxalic acid dihydrazide or adipic acid dihydrazide, may also be used as chain lengthening agents. According to this embodiment, masked isocyanate groups could also be built into the reaction products by suitable choice of the nature and proportions of the reactants so that self cross-linking end products are formed in accordance with the above description. However, the incorporation of masked isocyanate groups may, of course, also be dispensed with in accordance with the above description so that this embodiment may also be used to produce oligourethanes which are not self cross-linking, but can be cross-linked with polyisocyanates, preferably with masked polyisocyanates.

According to a further, also less preferred embodiment of the preparation of the oligourethanes according to the invention, there are used excess quantities of polyisocyanates which are not masked, for example, using an NCO/OH equivalent ratio of about 1.2:1 to 5:1, preferably about 1.5:1 to 3:1, so that products having free isocyanate groups are again obtained in which the isocyanate groups may subsequently be masked with masking agents of the type exemplified above after preparation of the reaction products.

All of the embodiments of the preparation of the oligourethanes according to the invention result in end products which contain (a) about 0.1 to 3, preferably about 0.3 to 2% by weight of tertiary amino nitrogen atoms (calculated as nitrogen, atomic weight =14), (b) up to about 15, preferably up to about 10% by weight of free isocyanate groups, and (c) up to about 15, preferably up to about 10% by weight of masked isocyanate groups (calculated as NCO, molecular weight =42).

When using the tertiary amines according to this invention which have only one hydroxyl group, the nitrogen atoms mentioned under a) are in end positions, but when corresponding but higher valent alcohols are used, the nitrogen atoms are incorporated within the molecule. In accordance with the comments made above concerning the NCO/OH equivalent ratio and the functionality of the starting materials, the term "oligourethanes" as used in the context of the present invention includes both mixtures of low molecular weight oligourethanes with excess quantities of optionally partially blocked polyisocyanates and relatively high molecular weight "oligourethanes," which would be better described as "polyurethanes" and which are obtained when polyisocyanates which are at least di-functional are reacted with tertiary amines which are at least di-functional and optionally at least di-functional chain lengthening agents, using the starting materials in almost equivalent quantities. As already described above, however, this method is less preferred. The particulars given under (a) to (c) refer to the products obtained by the above described process for the preparation of the oligourethanes according to the invention. These products, as already mentioned above, may be pure oligourethanes or mixtures of pure oligourethanes with excess starting materials, in particular with optionally partly blocked isocyanates, or they may be relatively high molecular weight "oligourethanes," i.e. polyurethanes.

Particularly preferred oligourethanes are those which contain (a) about 0.3 to 1.5% by weight of tertiary amino nitrogen atoms, (b) up to about 8% by weight of free isocyanate groups, and (c) up to about 8% by weight of masked isocyanate groups, with the proviso that the equivalent ratio of free and masked isocyanate groups to the tertiary amino groups is in the range of about 1:1 to 1.5:1, preferably about 1:1 to 1.2:1.

Oligourethanes according to the invention which are not self cross-linking may be mixed with organic polyisocyanates having free and/or masked isocyanate groups to form mixtures which are stable in storage at room temperature and capable of undergoing cross-linking at elevated temperatures. Polyisocyanates suitable for this purpose include the compounds already mentioned above as suitable for preparing the oligourethanes and in this case completely masked polyisocyanates are also suitable. These polyisocyanates are preferably higher than difunctional polyisocyanates, based on the free and masked isocyanate groups.

When preparing the heat cross-linkable mixtures of oligourethanes which do not contain free or masked isocyanate groups and polyisocyanates as crosslinking agents, which may contain masked isocyanate groups, the proportions in which the individual components are used are preferably calculated to provide about 1 to 1.5, preferably about 1 to 1.2 free and/or masked isocyanate groups of the added polyisocyanate for each tertiary amino nitrogen atom.

Transitional forms between the two embodiments are, of course, possible. For example, the oligourethanes according to the invention but not in sufficient quantity for complete self cross-linking. Accordingly, the additional quantity of masked or free isocyanate groups required for cross-linking is provided in the form of the added polyisocyanates which may have masked isocyanate groups.

Both the self cross-linking systems and those which may be cross-linked in the form of the above mentioned 2-component systems may be converted into the cross-linked stage by brief heating to elevated temperatures of about 90° to 160° C., preferably about 110° to 130° C.

The heat cross-linkable systems according to the invention are in particular valuable binders for the preparation of heat curable lacquers and coating compounds. They are preferably applied from a solution in a suitable solvent, e.g. one of the solvents already mentioned above as examples or mixtures of these solvents. The substrates may be any materials capable of withstanding the elevated temperatures required for cross-linking, e.g. wood, paper, cardboard, textiles, plastics and metals.

Application may be carried out in known manner by spraying, roller application, doctor kiss coating, immersion, printing or spread coating. The amounts applied are chosen to provide thicknesses measuring about 5–1,000 μm when dry. Any solvent left after application is removed by drying. The resulting films are then generally soft and in some cases even tacky, and may be attacked by solvents. After cross-linking at about 90°–160° C., preferably about 110°–130° C., the lacquer coats are dry and firm and undergo only slight swelling even in polar solvents.

In the examples which follow, all the percentages are percentages by weight.

EXAMPLES

EXAMPLE 1

165 parts of a polyether based on bisphenol A and propylene oxide (OH number 200), 200 parts of a polypropylene glycol (OH number 112) and 90 parts of a polyether based on trimethylol propane and propylene oxide (OH number 370), were dehydrated under vacuum at 100° C., and 209 parts of a mixture of 80 parts by weight of 2,4- and 20 parts by weight of 2,6-diisocyanatotoluene (NCO/OH equivalent ratio =1.5:1) were then added after the dehydrated mixture had cooled to 70° C. The reaction mixture was stirred at this temperature until the isocyanate content had fallen to 4.5%. 34 parts of ε-caprolactam were then introduced into the mixture and stirring was continued until the isocyanate content was 3%. The partially masked isocyanate prepolymer was then diluted with 300 parts of acetone. 44 parts of an adduct of 1 mol of diethanolamine and 1 mol of acrylic acid amide were now introduced into the solution. The solution was then stirred under reflux until only minor quantities of free isocyanate groups could be detected in the IR spectrum. The low viscosity solution had a solids content of 70%. The dissolved solid material had a tertiary amino group content of 0.47%, a free isocyanate group content of <0.1% and a masked isocyanate group content (calculated as NCO) of 1.7%.

A wet film of about 100 μ in thickness was applied to an untreated steel sheet and dried at room temperature for 1 hour. After a further 10 minutes drying at 60° C., a soft, tacky coating was obtained, which could easily be removed with acetone.

After heating for 1 hour at 110° C., the film was firm and dry and could not be removed with acetone.

EXAMPLE 2

167 parts of a polyether based on bisphenol A and propylene oxide (OH number 200), 168 parts of a polyester of hexane diol and adipic acid (OH number 133) and 90 parts of a polyether of trimethylol propane and propylene oxide (OH number 370), were dehydrated under vacuum at 100° C., and 209 parts of a mixture of 80 parts by weight of 2,4- and 20 parts by weight of 2,6-diisocyanatotoluene (NCO/OH equivalent ratio =1.5:1) were added when the dehydrated mixture had cooled to 70° C. The mixture was stirred at this temperature until the isocyanate content had fallen below 5%. 34 parts of ε-caprolactam were then introduced into this mixture and stirring was continued until the isocyanate content was about 3%. The isocyanate prepolymer was then diluted with 289 parts of acetone. 44 parts of the "Michael" adduct described in Example 1 were then introduced into this solution. The solution was stirred under reflux until only small quantities of free isocyanate groups could be detected in the IR spectrum. The low viscosity solution had a solids content of 70%. The dissolved solid substance contained 0.49% of tertiary nitrogen atoms, 0.1% of free isocyanate groups and 1.77% of masked isocyanate groups.

A film was formed as described in Example 1 and dried. After 30 minutes heating at 130° C., a dry, glossy film which was resistant to acetone was obtained.

EXAMPLE 3

An isocyanate prepolymer was prepared as described in Example 1. 45 parts of ε-caprolactam were introduced into this prepolymer at 70° C. and the mixture was stirred until the isocyanate content was about 2.9%. After the mixture had been dissolved in 312 parts of acetone, 58 parts of an adduct of 1 mol of N-methyl ethanolamine and 1 mol of acrylic acid amide were added. The solution was stirred under reflux until only traces of free isocyanate groups could be detected in the IR spectrum. The dissolved solid substance contained 0.73% of tertiary nitrogen atoms and had a free isocyanate group content of <0.1% and a masked isocyanate group content of 2.2%.

A film was prepared from the 70% solution as described in Example 1. After drying, this film was soluble in acetone and tacky. After 1 hour heating at 100° C., the film was soft, but tack-free and did not swell in acetone.

EXAMPLE 4

The isocyanate prepolymer from Example 1 was reacted with 45 parts of ε-caprolactam at 75° C. until the isocyanate content had fallen below 3%. After the reaction product had been dissolved in 312 parts of acetone, 51 parts of an adduct of 1 mol of N-methyl ethanolamine and 1 mol of acrylonitrile were added and the mixture was stirred under reflux until almost complete disappearance of the isocyanate band in the IR spectrum. The solution thus obtained had a solids content of 70%. The dissolved solid substance contained 0.74% of tertiary nitrogen atoms and had a free isocyanate group content of <0.1% and a masked isocyanate group content of 2.2%.

A film was formed from the solution as described in Example 1. The film was tacky and soluble in acetone. After 20 minutes heating at 130° C., the film was soft and dry and only slightly swelled in acetone.

EXAMPLE 5

The isocyanate prepolymer from Example 1 was reacted with 34 parts of ε-caprolactam at 75° C. until the isocyanate content had fallen below 3%. After dissolving in 300 parts of xylene, 40 parts of an adduct of 1 mol of diethanolamine and 1 mol of acrylonitrile were added and the solution was stirred at 70° C. until only traces of free isocyanate groups could be detected by IR spectroscopy. A low viscosity, slightly cloudy 70% solution was obtained. The dissolved solid substance contained 0.47% of tertiary nitrogen atoms and had a free isocyanate group content of 0.1% and a masked isocyanate group content of 1.7%.

A film which was tacky and soluble in acetone was formed from the solution as described in Example 1. After 30 minutes heating at 110° C., the film was firm, dry and tack-free and insoluble in acetone.

EXAMPLE 6

The isocyanate prepolymer from Example 1 was reacted with 34 parts of ε-caprolactam at 70° C. until the isocyanate content was about 2.9%. After the reaction mixture had been dissolved in 298 parts of acetone, 47 parts of an adduct of 1 mol of bis-(2-hydroxypropyl)-amine and 1 mol of acrylonitrile were added and the mixture was stirred under reflux until almost complete disappearance of the isocyanate band in the IR spectrum. The solution obtained had a solids content of 70%. The dissolved solid substance contained 0.47% of tertiary nitrogen atoms and had a free isocyanate group content of <0.1% and a masked isocyanate group content of 1.7%.

A tacky film was obtained by the method of Example 1, but was tack-free and insoluble in acetone after 45 minutes heating at 100° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An oligourethane which is stable in storage at room temperature and either self cross-linking at elevated temperature or capable of being cross-linked with organic polyisocyanates comprising
(a) about 0.1 to 3% by weight of tertiary amine nitrogen atoms in the form of structural units corresponding to the formula:

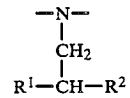

attached through urethane groups in end positions and/or within the molecule, wherein
$R^1$ represents hydrogen or an alkyl group having 1 to 4 carbon atoms,
$R^2$ represents $-C\equiv N$, $-CO-NH_2$, $-CO-NHR^3$, $-CO-NR_2^3$ or $-COOR^3$ and
$R^3$ represents a monovalent hydrocarbon group optionally having inert substituents,
(b) up to about 15% by weight of isocyanate groups, and
(c) up to about 15% by weight of masked isocyanate groups.

2. The oligourethanes of claim 1 wherein the structural units set forth in (a) are incorporated by reacting an organic polyisocyanate optionally containing urethane groups, in which the isocyanate groups are optionally partly in masked form with a compound corresponding to the formula:

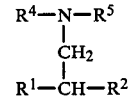

wherein
$R^1$ and $R^2$ have the meaning indicated in claim 1 and $R^4$ and $R^5$ may be identical or different and represent hydrocarbon groups having 1 to 20 carbon atoms or hydrocarbon groups having 2 to 20 carbon atoms and containing at least 1 alcoholic hydroxyl group as substituent, provided that at least one of the groups $R^4$ or $R^5$ has at least one alcoholic hydroxyl group.

3. An oligourethane which is stable in storage at room temperature and either self cross-linking at elevated temperature or capable of being cross-linked with organic polyisocyanates comprising
(a) 0.3 to 1.5% by weight of tertiary amino nitrogen atoms in the form of structural units corresponding to the formula:

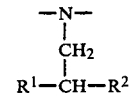

attached through urethane groups in end positions and/or with the molecule wherein
$R^1$ represents hydrogen or a methyl group,
$R^2$ represents $-C\equiv N$, $-CO-NH_2$, $-CO-NHR^3$, $-CO-NR_2^3$ or $-COOR^3$ and
$R^3$ represents an alkyl group having 1 to 4 carbon atoms,
(b) up to about 8% by weight of isocyanate groups, and (c) up to about 8% by weight of masked isocyanate groups provided that the total content of free isocyanate groups (b) and masked isocyanates groups (c) and the content of tertiary amino nitrogen atoms (a) correspond to an equivalent ratio of (b +c) : a of about 1:1 to 1.5:1.

4. The oligourethanes of claim 3 wherein the structural units set forth in (a) are incorporated by reacting an organic polyisocyanate optionally containing urethane groups, in which the isocyanate groups are optionally partly in masked form with a compound corresponding to the formula:

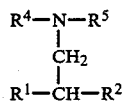

wherein
$R^1$ and $R^2$ have the meaning indicated in claim 3 and $R^4$ and $R^5$ may be identical or different and represent hydrocarbon groups having 1 to 20 carbon atoms or hydrocarbon groups having 2 to 20 carbon atoms and containing at least 1 alcoholic hydroxyl group as substituent, provided that at least one of the groups $R^4$ or $R^5$ has at least one alcoholic hydroxyl group.

5. A process for the preparation of an oligourethane which is stable in storage at room temperature and either self cross-linking at elevated temperature or capable of being cross-linked with organic polyisocyanates comprising
(a) about 0.1 to 3% by weight of tertiary amine nitrogen atoms in the form of structural units corresponding to the formula:

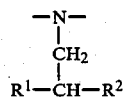

attached through urethane groups in end positions and/or within the molecule, wherein
$R^1$ represents hydrogen or an alkyl group having 1 to 4 carbon atoms,
$R^2$ represents $-C\equiv N$, $-CO-NH_2$, $-CO-NHR^3$, $-CO-NR_2^3$ or $-COOR^3$ and
$R^3$ represents a monovalent hydrocarbon group optionally having inert substituents,
(b) up to about 15% by weight of isocyanate groups, and
(c) up to about 15% by weight of masked isocyanate groups
which comprises reacting an organic polyisocyanate optionally containing urethane groups, in which the isocyanate groups are optionally partly in a masked form, with a compound corresponding to the formula:

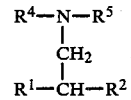

wherein
$R^1$ and $R^2$ have the meaning indicated above and $R^4$ and $R^5$ may be identical or different and represent hydrocarbon groups having 1 to 20 carbon atoms or they may represent hydrocarbon groups having 2 to 20 carbon atoms and containing at least 1 alcoholic hydroxyl group as substituent, provided that at least one of the groups $R^4$ or $R^5$ has at least 1 alcoholic hydroxyl group,
the reaction being carried out at an equivalent ratio of free isocyanate groups to hydroxyl groups of about 0.7:1 to 2.5:1.

6. A process for the production of a coating on a heat-resistant substrate which comprises applying the oligourethane of claim 1 to said substrate and cross-linking the coating by heating to a temperature of up to about 160° C.

7. The process of claim 6 wherein said oligourethane is in admixture with an organic polyisocyanate, optionally having masked isocyanate groups.

* * * * *

UNITED STATES PATENT AND TRADEMARK OFFICE
CERTIFICATE OF CORRECTION

PATENT NO. : 4,559,396
DATED : December 17, 1985
INVENTOR(S) : Shosaku Sasaki, Nobuo Kaiya & Akihiko Shirahata It is certified that error appears in the above-identified patent and that said Letters Patent is hereby corrected as shown below:

On the cover page, in the title, "PEELLABLE" should read --PEELABLE--.

On the cover page, in the abstract (line 5), "ene-yen" should read --ene-yne--.

In Col. 1, line 1, "PEELLABLE" should read --PEELABLE--.

In Col. 1, line 38, "$\geq 100°C.$," should read --$\leq 100°C.$,--.

In Col. 2, line 50, "composition" should read --compositions--

[SEAL]

Signed and Sealed this

Nineteenth Day of August 1986

Attest:

DONALD J. QUIGG

Attesting Officer

Commissioner of Patents and Trademarks